United States Patent

[11] 3,576,201

[72] Inventors John G. Smith
  Markham, Ontario;
  Daivd L. Spanjer, Willowdale, Ontario,
  Canada
[21] Appl. No. 817,746
[22] Filed Apr. 21, 1969
[45] Patented Apr. 27, 1971
[73] Assignee Massey-Ferguson Inc.
  Des Moines, Iowa

[54] TREE-CHOKING APPARATUS
  11 Claims, 10 Drawing Figs.
[52] U.S. Cl. ................................................. 144/3,
   144/34
[51] Int. Cl. ........................................................ A01g 23/02
[50] Field of Search ........................................ 144/3 (4), 2
   (21), 34, 34 (1—5), 309 (34)

[56] References Cited
  UNITED STATES PATENTS
  1,797,063 3/1931 Meister ........................ 144/3

3,102,563 9/1963 Horncastle ................... 144/3
3,460,594 8/1969 Burkhalter ................... 144/3

Primary Examiner—Gerald A. Dost
Attorney—Gerhardt, Greenlee & Farris

ABSTRACT: A log skidder having a winch, a main line and an arch is provided with a movable boom assembly which mounts a tree shear at its end. Also mounted on the boom assembly is storage means for storing a plurality of choker cables which are attached to the main line, power means for encircling a tree with a choker cable to choke the tree, and a tree clamp. To harvest a tree, the boom is positioned near the tree and the clamp is actuated to orient the shear and power means relative to the tree. The power means are then actuated to encircle the tree with the choker cable and the shear is actuated to feel the tree, whereupon the skidder may then move to another tree to repeat the same sequence. In this manner, a plurality of trees may be choked and felled in rapid succession.

INVENTORS.
JOHN G. SMITH
BY DAVID L. SPANJER

Tweedale & Gerhardt
ATTORNEYS.

INVENTORS.
JOHN G. SMITH
BY DAVID L. SPANJER

Tweedale & Gerhardt
ATTORNEYS.

INVENTORS.
JOHN G. SMITH
BY DAVID L. SPANJER
Tweedale & Gerhardt
ATTORNEYS.

TREE-CHOKING APPARATUS

This invention relates generally to apparatus for transporting trees and more specifically to power means for choking a tree.

The most widely used method of harvesting trees is to manually fell trees, attach choker cables to the felled trees, winch the trees into close proximity to a skidder, and skid the trees from the stump to a landing. This method requires the use of manual labor to operate a skidder and to choke and usually also requires that the skidder be idle during the slow manual choking operation. Because of the high cost of machinery and the increasing cost of manual labor, there is a need for a more productive and economical method of tree harvesting.

To further mechanize the harvesting process, power tree fellers in the form of power shears mounted on tractors or skidders have been developed. Skidders have been provided with boom grapples for gathering felled trees during skidding. Also machines known generically as feller skidders have been developed to fell trees and secure the tree cut ends to the machine for skidding. These operations are more economical, but are not ideal for several reasons. Use of a grapple skidder requires separate felling and a tree marshalling operation. Also, if a grapple skidder or feller skidder should lose traction, there is no expeditious way to drop the trees and move to firmer ground without moving beyond reach of the trees. However, in conventional choker skidders, if traction is lost, the logs may be dropped while the skidder moves to more solid ground, whereupon the logs may again be winched back to the skidder.

It is therefore one object of this invention to provide means on a skidder for power choking a tree thereby retaining the advantages of the choker cable and winch.

It is another object to provide a skidder with means for sequentially power choking and felling a tree.

It is a further object to provide power means for attaching a choker cable to a tree.

In its broadest sense this invention consists of apparatus for transporting trees, including cable means and power means for encircling the cable means around a tree to attach the tree to the cable means and enable movement of the tree by the apparatus.

More specifically, this invention comprises a tree-harvesting machine including a means for felling a tree, a winch, cable means operatively wound on the winch, and power means for encircling the cable means around a tree to attach the tree to the cable means and enable movement of the tree by the winch after felling.

These and further objects and features of this invention can be readily understood by reference to the following detailed description of the attached drawings, wherein.

Figure 1:
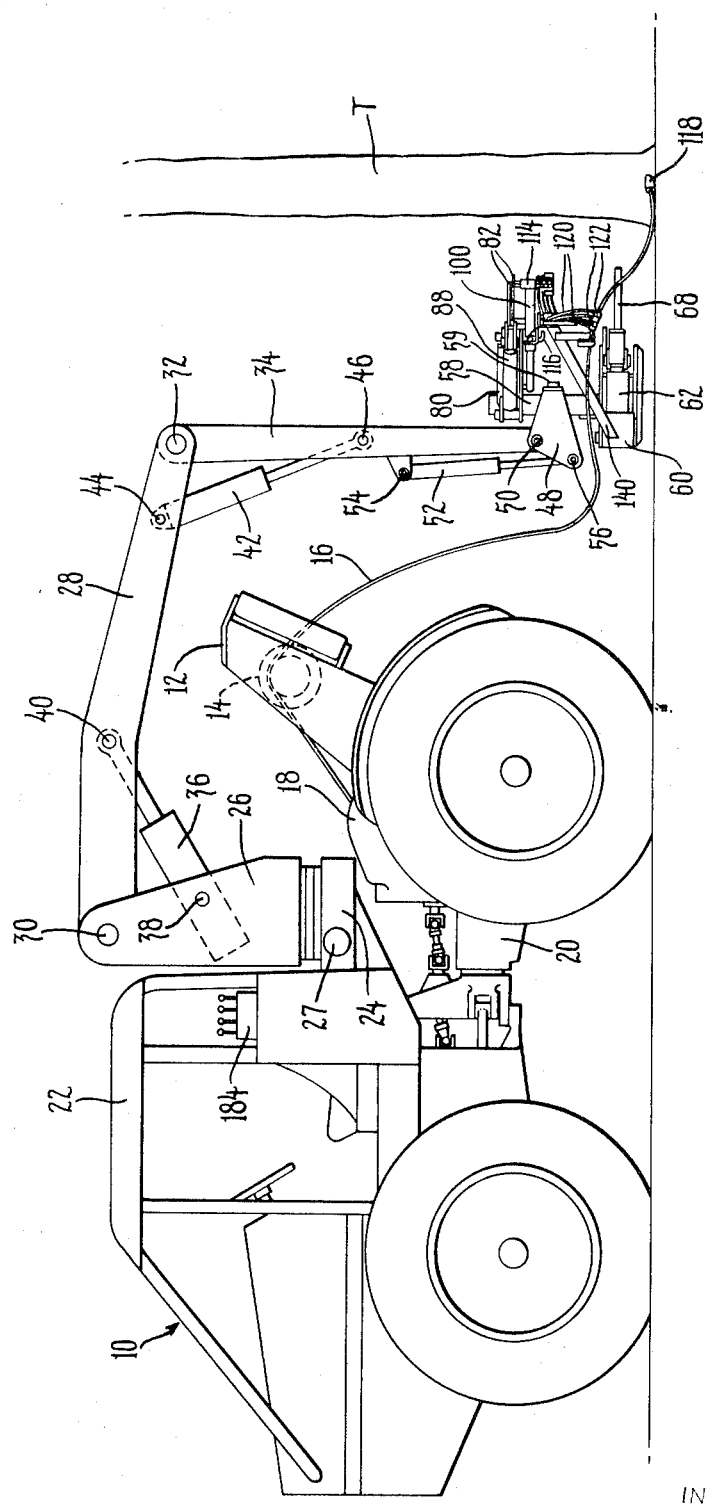
FIG. 1 is a side elevation of a skidder having a boom-mounted felling shear and embodying a tree-choking apparatus according to this invention.

Referring now to FIG. 1 of the drawings, a four-wheel drive articulated skidder 10, of the type shown in copending applications Ser. No. 759,646, filed Sept. 13, 1968, "Adjustable Skidder Arch" and Ser. No. 755,532, filed Aug. 27, 1968, "Skidder With Rear Pivoting Means," is provided with a fairlead arch 12 having a fairlead horizontal roller 14 over which is threaded a cable or mainline 16. One end of mainline 16 is connected to a conventional power-driven winch 18 mounted on the rear section 20 of the skidder.

Behind the driver's cab 22 of skidder 10 is mounted a platform 2 which pivotally mounts a boom support 26 driven by a hydraulic cylinder 27. An inner boom 28 is pivoted at 30 to support 26 and pivotally supports at its other end 32 an outer boom 34. Inner boom 28 is positioned by a hydraulic cylinder 36 which is pivoted at 38 to support 26 and at 40 to boom 28. Similar control of outer boom 34 relative to boom 28 is provided by a hydraulic cylinder 42 which is pivoted at 44 to boom 28 and at 46 to boom 34.

A pivot head 48 is horizontally pivoted at 50 at the lower end of boom 34 and is positioned relative thereto by a hydraulic forward tilt cylinder 52 which is pivoted at 54 to boom 34 and at 56 to pivot head 48. Pivot head 48 laterally pivotally mounts a generally upright shear head 58 at 59.

Figure 2:
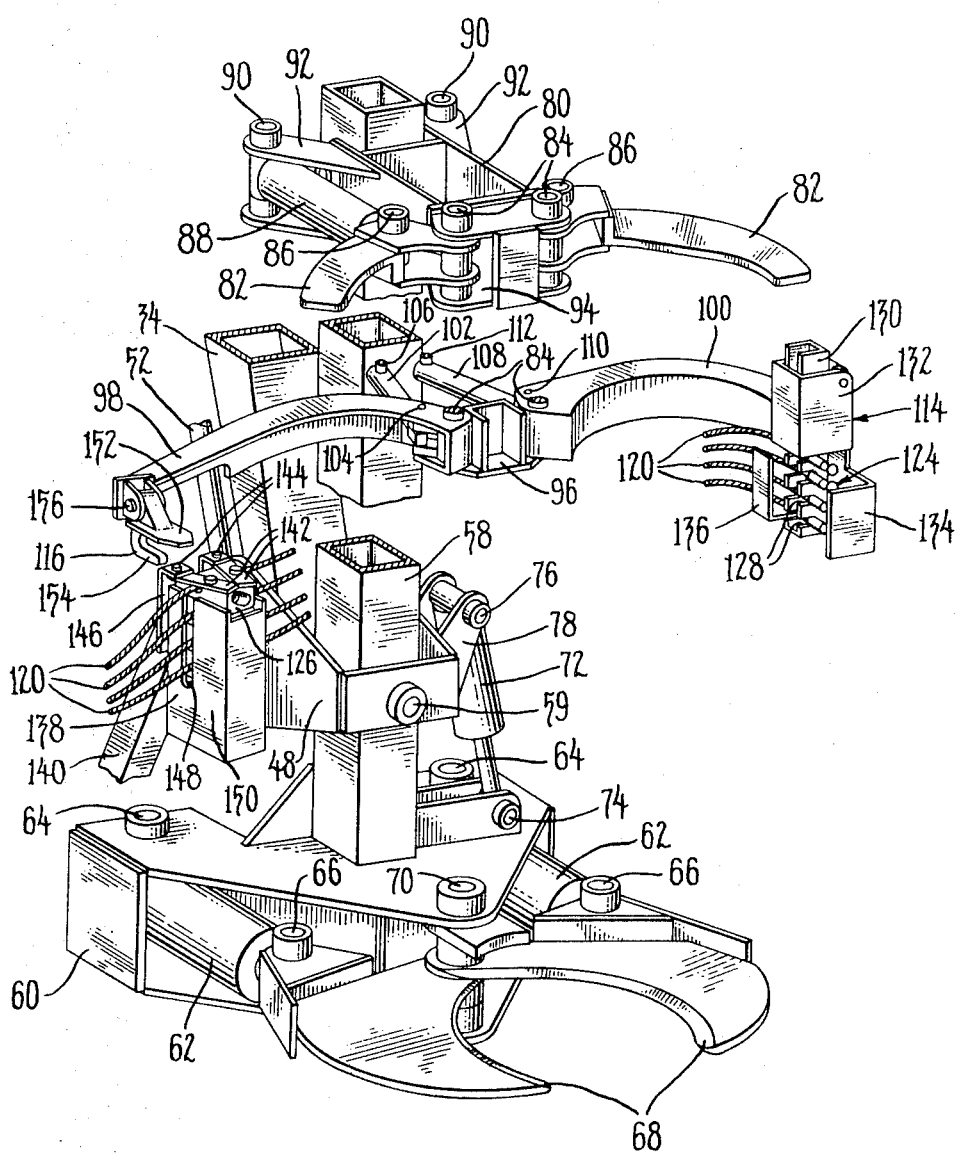
FIG. 2 is an enlarged exploded perspective view of the felling and choking apparatus of this invention.

Referring additionally to FIG. 2, a housing 60 is rigidly mounted at the lower end of shear head 58 and houses a pair of hydraulic shear cylinders 62 which are pivoted thereto at 64. The other ends of cylinder 62 are pivoted at 66 to shear blades 68 that are pivotally supported at 70 between the upper and lower walls of housing 60.

The shear head 58 is tilted laterally of outer boom 34 by a hydraulic side tilt cylinder 72 which is pivoted at 74 to housing 60 and is pivoted at 76 to a bracket 78 rigidly mounted on pivot head 48. As viewed in FIG. 2, operation of cylinder 72 causes tilting movement of shear head 58 about pivot 59.

Adjacent its upper end, shear head 58 rigidly mounts a support bracket 80 which pivotally mounts a pair of clamp arms 82 at 84. Outwardly at pivots 84, arms 82 are each pivoted at 86 to a hydraulic clamp cylinder 88. Each cylinder 88 is pivoted at its rearward end 90 to support flanges 92 which are secured to support bracket 80. Extension of the cylinders 88 causes the outer ends of clamp arms 82 to approach each other as will be later described.

Between the lower plate 94, bracket 80 and a support bracket 96, a pair of choker arms 98 and 100 are mounted on pivots 84. A hydraulic choker arm cylinder 102 is pivoted at 104 to arm 98 and at 106 to plate 94 and controls the position of arm 98. Similarly, a hydraulic choker arm cylinder 108 is pivoted at 110 to arm 100 and at 112 to plate 94 and controls the position of arm 100. A magazine 114 is mounted at the outer end of arm 100, while a pickup device 116 is pivoted to the outer end of arm 98, to be later described.

Figure 3:
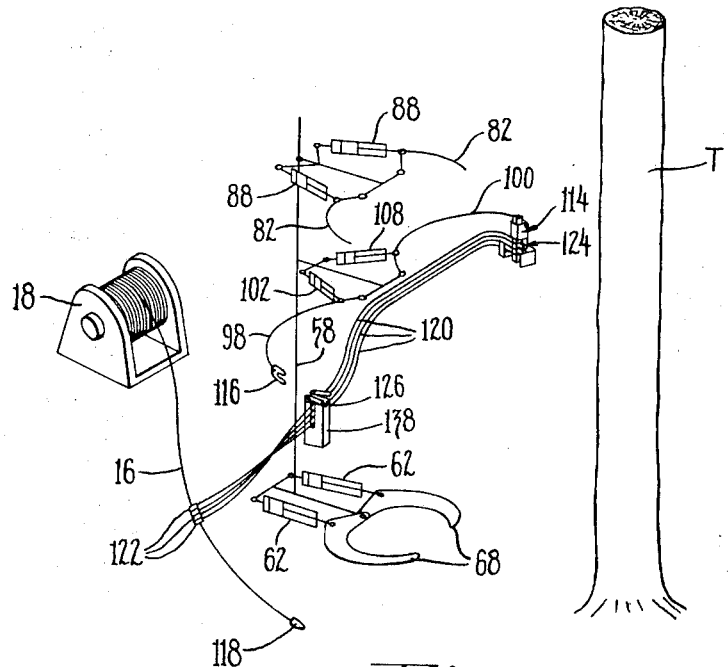
FIG. 3 is a schematic perspective view of tee felling and choking apparatus shown in tree-approach position.
Figure 4:
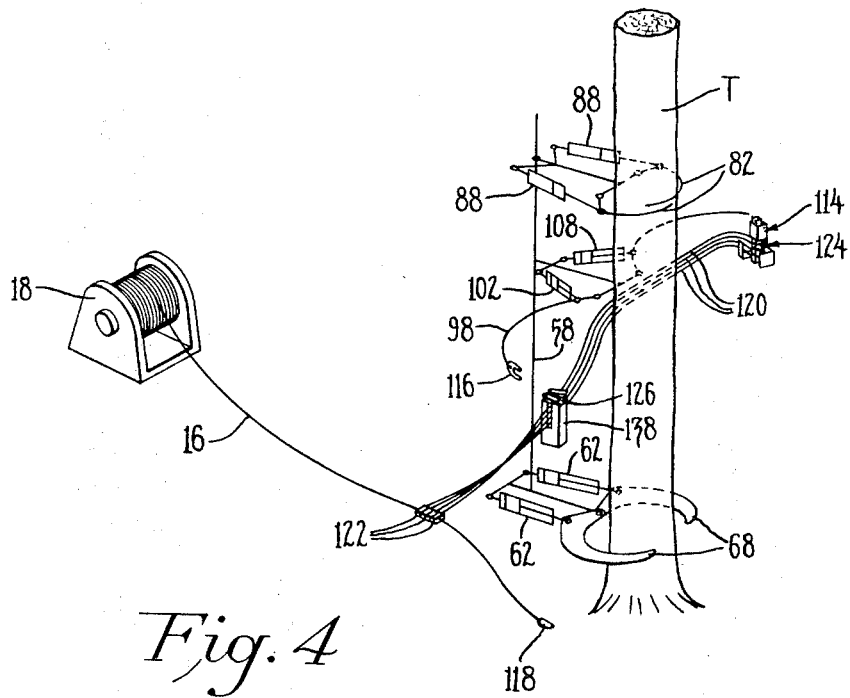
FIG. 4 is a view similar to FIG. 3, showing the tree clamped.

Referring now to FIGS. 1 and 3, the mainline 16 terminates in a nubbin 118. A plurality of choker cables 120 are connected by conventional fasteners 122 to the mainline 16. A latch member or stud 124 is mounted at the other end of each choker cable 120. Another latch or socket member 126 is slideably mounted intermediate the ends of each cable 120.

Referring again to FIG. 2, each of the studs 124 is received within slots 128 formed in spaced walls of a clip 130 slideably mounted within a housing 132 of magazine 114. Clip 130 is biased upwardly by resilient means (not shown) to engage the upper stud 124 with the lower edge of the housing. The housing also includes a front protective wall 134 which is spaced beneath housing 132 to permit front access to the upper stud 124. A side shield 136 is also provided to align cables 120 and prevent a pull thereon from dislodging studs 124 from slots 128. The shield 136 is also spaced beneath housing 132 to permit the top cable to be pulled free.

A magazine 138 is mounted on a strut 140 which projects upwardly from the shear housing 60. A plurality of socket members 126 are vertically arranged within the magazine 138 and are biased upwardly so that the upper most socket member 126 abuts a pair of arms 142 which are pivoted at 144 to spaced flanges 146 mounted on the magazine 138. The choker cables 120 project from either side of magazine 138 through vertical slots 148. As can be seen in FIG. 2, the uppermost socket member 126 is held against lateral movement by the upwardly projecting sidewalls 150 of the magazine 138.

The pickup device 116 comprises an upper plate 152 and a depending hook 154, and is pivoted at 156 to the end of arm 98. The magazine 138 is positioned to lie in the path of movement of pickup device 116. The magazine front and rear walls are notched to fully expose the uppermost socket member 126.

The of the aforedescribed apparatus will now be described with reference to FIGS. 3—6, which schematically depict the sequential operation of the construction shown in FIGS. 1 and 2. The skidder 10 is driven near a tree T, preferably on the right side of the skidder, as shown in FIGS. 1 and 3, and the winch 18 is put in a free-spool condition. The hydraulic cylinders 27, 36 and 42 are then operated to position the shear head 58 in close proximity to the tree, while cylinders 52 and 72 are operated to correct for any tilting of the shear head 58 relative to the tree. After the shear head 58 has attained the position shown in FIG. 4, in which the shear blades 68 are positioned about the tree, the clamp cylinders 88 are extended so that arms 82 securely grasp the tree.

Figure 5:
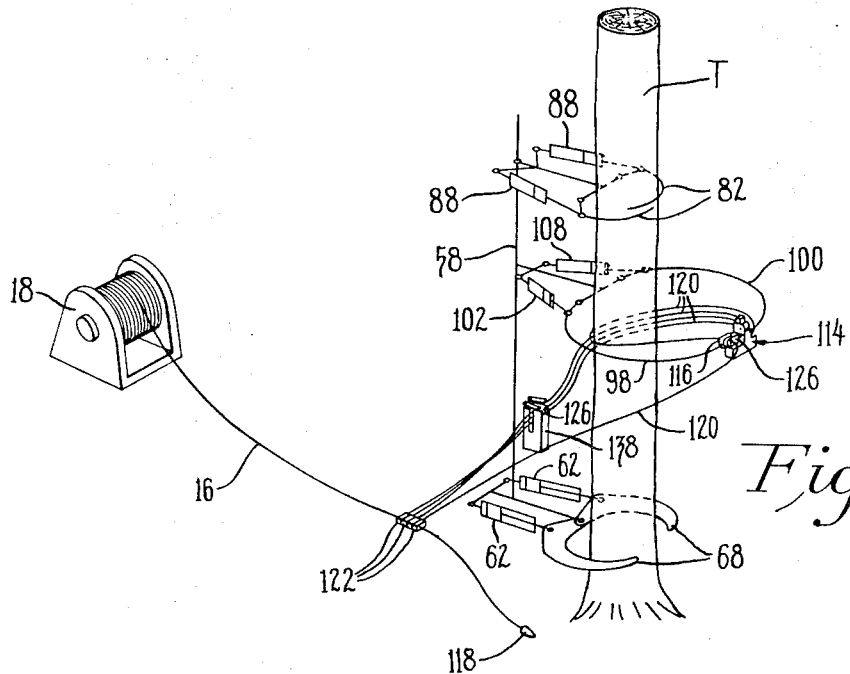
FIG. 5 is a view similar to FIG. 3, showing choking of the tree.

As shown in FIG. 5, cylinders 102 and 108 are next actuated to attach a choker cable 120 about the tree. Upon actuation of cylinder 108, arm 100 will encircle the tree approximately 180° with its uppermost stud 124 positioned for fastening. Upon actuation of cylinder 102, arm 98 moves pickup device 116 through the magazine 138 between flange 146 to grasp the uppermost socket member 126 between plate 152 and hook 154. Continued movement of arm 98 carries the socket member 126 around the tree where it lockingly engages the stud 124.

Figure 6:
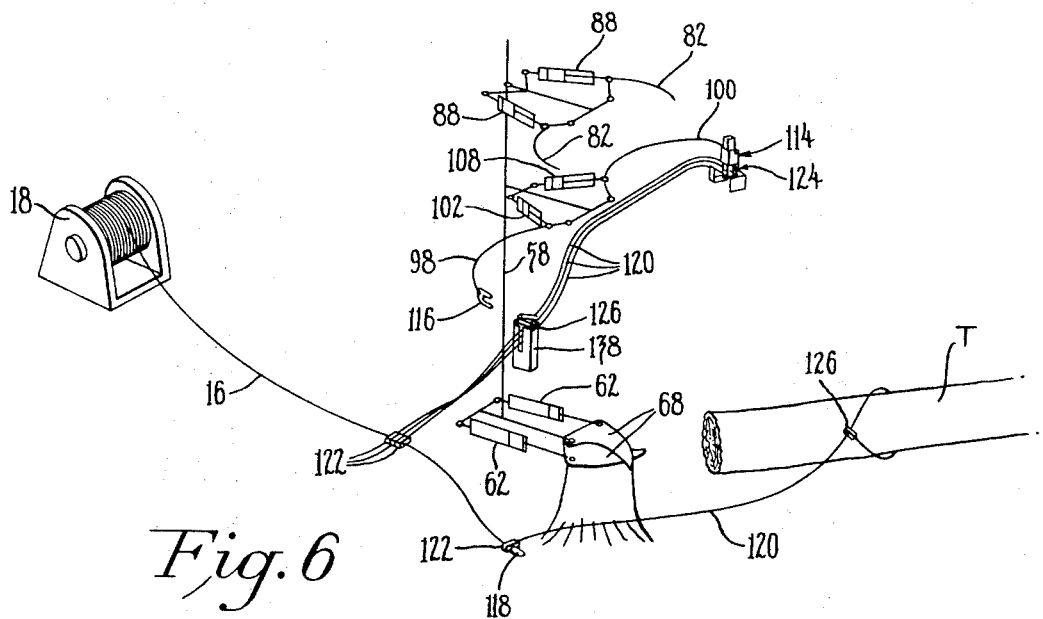
FIG. 6 is a view similar to FIG. 3, showing a choked tree after it has been felled by the shear.
Figure 7:
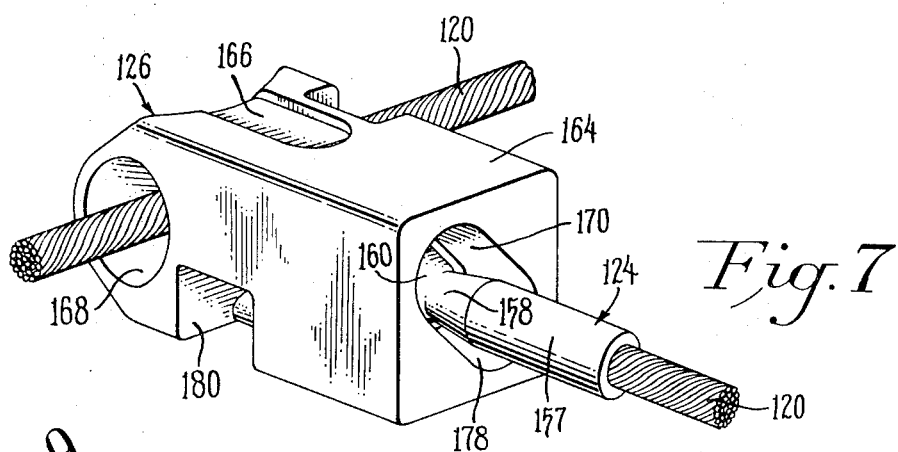
FIG. 7 is an enlarged perspective view of the choker cable latch means, shown latched.
Figure 8:
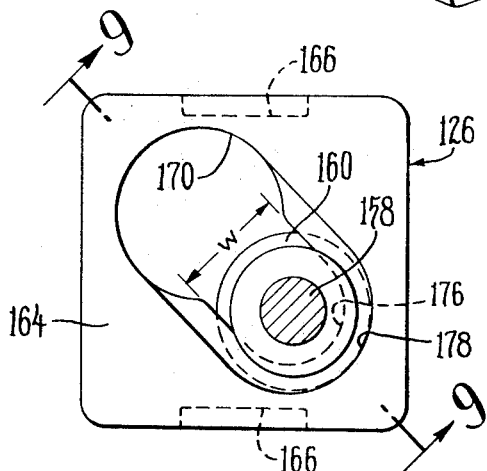
FIG. 8 is an end view of the latch.
Figure 10:
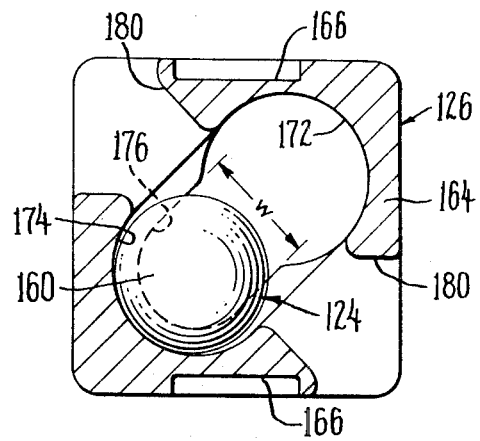
FIG. 10 is a sectional view taken generally along lines 10—10 of FIG. 9.
Figure 9:
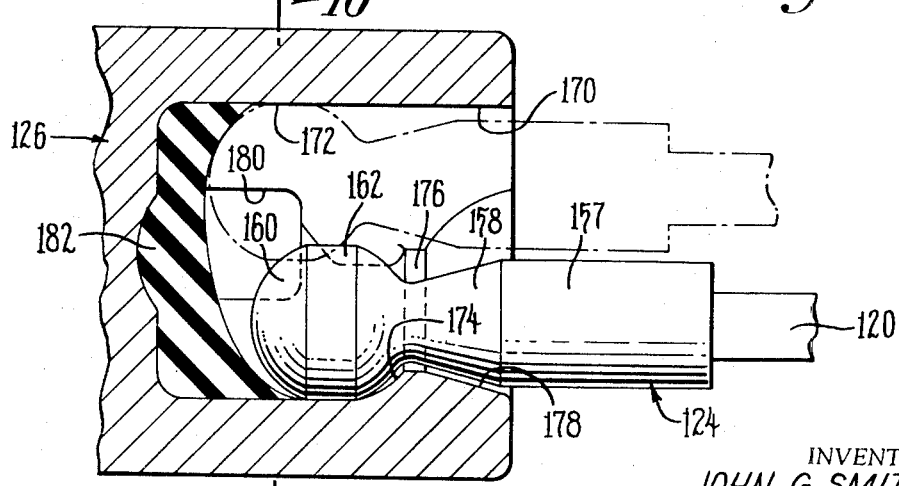
FIG. 9 is a sectional view taken generally along lines 9—9 of FIG. 8.

After the tree has been clamped and choked, the shear cylinders 62 are actuated to close the blades 68 and sever the tree T, as shown in FIG. 6. At this point cylinders 52 and 72 may be operated to tilt the severed and clamped tree away from the skidder, whereupon cylinders 102 and 108 are retracted to retract choker arms 98 and 100 and cylinders 88 are similarly retracted to retract clamp arms 82. The tree T will then fall away from the skidder so that the fastener 122 pulls on choker cable 120 to pull it through socket member 126 and tighten it about the tree. Of course, other means to directionally fell the tree could be used.

The skidder 10 is then driven to an adjacent tree where the sequential clamping, choking, and severing will occur. The mainline 16 will pay out from winch 18 which is in free spool and is weighted by the previously choked and felled tree. This operation continues until a full load has been gathered and/or all of the choker cables have been used. At this point the mainline 16 is winched in with the choker cables 120 to bring the tree butts close to the skidder. The skidder 10 is then driven to a nearby landing, whereupon the cables 120 are disengaged from the mainline 16 in a conventional manner by unlatching the fasteners 122.

The construction of stud 124 and socket 126 and the latching operation thereof will now be described with reference to FIGS. 7—10. The stud 124 comprises a shank portion 157 which is secured to the end of the choker cable 120. The shank 157 terminates in a necked down portion 158 which expands to a spherical head portion 160 having a circumferential land 162 of reduced diameter formed thereabout.

The socket member 126 comprises a housing 164 having lands 166 formed on its top and bottom surfaces for engagement by the plate 152 and hook 154 of pickup device 116. Between the lands 166, housing 164 is laterally bored at 168 so that cable 120 may freely slip therethrough. An elongated aperture 170 is formed in the front face of housing 164 and opens into an entry bore 172 having a diameter slightly larger than the circumferential land 162 of the stud head 160.

When the ends of arms 98 and 100 are forced together by cylinders 102 and 108, stud head 160 is introduced axially into bore 172. Adjacent bore 172 is formed another bore 174 of equal diameter which tapers to a flange 176 of a diameter slightly larger than the diameter of necked down portion 158 of stud 124. Bore 174 then tapers out at 178 to aperture 170. The width w of the intersection of bores 172 and 174 is smaller than the diameter of land 162 to prevent passage of stud head 160, but is larger than the diameter of shank 157 to permit its passage between the bores. At the bottom of the bores 172 and 174, the housing 164 is diagonally machined to form a slot 180 to relieve the width w and interconnect the bores 172 and 174 with a passage of sufficient width to permit the head 160 to pass between the bores.

A plug 182 of resilient material, such as urethane or polystyrene, is secured to the bottom of the bores. Plug 182 is disced and is of a sufficient thickness so that when head 160 is introduced into bore 172 it cannot pass into bore 174 without compressing the plug 182. Thus, the head 160 is confined between the plug 182 and the bottom of flange 176. However, as stud 124 is forced to the bottom of bore 172, the head 160 compresses the plug 182 sufficiently to slip past flange 176 into the bottom of bore 174, as shown in phantom lines in FIG. 9. Stud 124 is then pulled outwardly in bore 174 as the tree T falls free until head 160 engages seat 176. At this point the stud 124 is securely latched within socket member 126 since head 160 cannot be pulled past flange 176 and cannot move past width w into bore 172. To disengage stud 124 from socket member 126, the above procedure is reversed by manually or mechanically forcing stud 124 downwardly to compress plug 182 and slip into the bore 172 from which it may be easily axially withdrawn.

Thus it is readily apparent that this invention provides a device for choking and severing a plurality of trees simply and efficiently by minimizing usage of manpower and minimizing skidder idle time. The skidder operator easily accomplishes severing, choking and winching merely by operating a set of conventional hydraulic controls 184 located in the cab 22, as shown in FIG. 1. These controls 184 operate the aforementioned hydraulic cylinders which are supplied with hydraulic fluid through conventional lines from a conventional pump driven by the skidder engine, all of which are well known and are therefore not shown. By utilizing choker cables to attach the trees to the skidder, the skidder operator retains all the benefits of choker skidding, mentioned previously.

The apparatus hereinbefore described can also be used to choke prefelled trees by actuating tilt cylinder 52 to move pivot head through 90° so that choker arms 98, 100 are perpendicular to the ground. Clamp arms 82, 84 are actuated by cylinders 88 to grasp and slightly lift the felled tree. Then cylinders 102, 108 are actuated to move arms 98, 100 about the tree to secure a choker cable 120. Thus, choking of felled trees may be accomplished by the apparatus, or the shear blades 68 and cylinders 62 could be deleted to provide a power choker only.

It is readily apparent that many modifications could be made to the preferred embodiment which has been shown and described above. Other types of fittings other than the stud 124 and socket member 126 are contemplated, as are other arrangements for attaching the choker cable about the tree. These and further modifications are contemplated within the scope of the appended claims.

We claim:

1. In combination: apparatus for transporting trees, cable means mounted on the apparatus, spaced cooperating latch means on a portion of the cable means, and power means for encircling said cable means portion around a tree to interengage the latch means and chokingly attach the tree to the cable means and enable movement of the tree by the apparatus.

2. A tree-harvesting machine, including: means for felling a tree, a winch, cable means operatively wound on the winch, spaced cooperating latch means on a portion of the cable means, and power means for encircling said cable means portion around a tree to interengage the latch means and chokingly attach the tree to the cable and enable movement of the tree by the winch after felling.

3. The tree-harvesting machine of claim 2, wherein: the cable means include a cable having one end connected to the winch, a latch member mounted on the other end and a second latch member mounted intermediate the ends, and the power means include means for engaging the latch members to attach the cable around the tree.

4. The tree-harvesting machine of claim 3, wherein: one of the latch members has an enlarged head, and the other member has a socket for retaining the head, an entry passage opening into the socket for introducing the head into the socket, and retaining means for retaining the head within the socket.

5. The tree-harvesting machine of claim 4, wherein: the retaining means include resilient means for restricting movement of the head between the entry passage and the socket.

6. The tree-harvesting machine of claim 3, wherein: the means for felling a tree include a movable boom, the power means include a pair of power-operated arms mounted on the boom for encircling the tree, storage means mounted on the boom for storing each of the latch members, and indexing means to orient the latch members and enable engagement thereof by the arms upon tree encircling to attach the cable around the tree.

7. The tree-harvesting machine of claim 6, wherein: a plurality of cables are provided, each having one end connected to the winch, a latch member mounted at one end and a second latch member mounted intermediate its ends, the latch members being stored in the storage means and sequentially oriented by the indexing means to enable sequential choking and felling of a plurality of trees for subsequent movement by the winch.

8. A tree-harvesting machine, including: a tree-felling assembly movably mounted on the machine, a winch mounted on the machine and having a main cable operatively attached thereto, a choker cable attached to the main cable, and power means mounted on the machine for choking a tree to be felled by attaching a choker cable around the tree to operatively attach the tree to the main cable for movement by the winch after felling.

9. The tree-harvesting machine of claim 8, including: a plurality of choker cables attached to the main cable, storage means mounted on the tree-felling assembly for storing the choker cables, and means mounting the power means on the tree-felling assembly for sequential attachment of choker cables around a plurality of trees to enable choking and felling of a plurality of trees for subsequent movement by the winch.

10. The tree-harvesting machine of claim 8, including: tree-grasping means mounted on the tree-felling means for grasping a tree before it is choked to enable orientation of the power means and tree-felling means relative to the tree.

11. In combination with a tree skidder mounting a winch, a cable powered by the winch, and tree-felling means, the improvement comprising: tree-encircling means attached to the cable for attaching a felled tree to the cable for movement by the winch, and power means for attaching the tree-encircling means to the tree before the tree is felled.